(12) United States Patent
Sonn et al.

(10) Patent No.: US 11,262,103 B1
(45) Date of Patent: Mar. 1, 2022

(54) HELIOSTAT LOCALIZATION IN CAMERA FIELD-OF-VIEW WITH INDUCED MOTION

(71) Applicants: Alexander Sonn, Pasadena, CA (US); William Gross, Pasadena, CA (US)

(72) Inventors: Alexander Sonn, Pasadena, CA (US); William Gross, Pasadena, CA (US)

(73) Assignee: HELIOGEN, INC., Pasadena, CA (US)

(*) Notice: Subject to any disclaimer, the term of this patent is extended or adjusted under 35 U.S.C. 154(b) by 0 days.

(21) Appl. No.: 16/457,597

(22) Filed: Jun. 28, 2019

Related U.S. Application Data (60) Provisional application No. 62/692,333, filed on Jun. 29, 2018.

(51) Int. Cl.
| | |
|---|---|
| *G02B 5/08* | (2006.01) |
| *F24S 40/90* | (2018.01) |
| *G06T 7/70* | (2017.01) |
| *G06T 7/80* | (2017.01) |
| *F24S 20/20* | (2018.01) |
| *F24S 50/20* | (2018.01) |
| *F24S 50/80* | (2018.01) |
| *G01J 1/42* | (2006.01) |
| *F24S 20/00* | (2018.01) |

(52) U.S. Cl.
CPC .............. *F24S 40/90* (2018.05); *F24S 20/20* (2018.05); *F24S 50/20* (2018.05); *F24S 50/80* (2018.05); *G06T 7/70* (2017.01); *G06T 7/80* (2017.01); *F24S 2020/10* (2018.05); *F24S 2020/23* (2018.05); *F24S 2050/25* (2018.05); *G06T 2207/20224* (2013.01); *G06T 2207/30244* (2013.01)

(58) Field of Classification Search
USPC ....... 348/61, 135, 129, 95, 80; 126/600, 601, 126/696, 259, 680, 681; 359/849, 846
See application file for complete search history.

(56) References Cited

U.S. PATENT DOCUMENTS

| | | | |
|---|---|---|---|
| 9,010,317 B1* | 4/2015 | Gross .................... | G01S 3/7803 126/573 |
| 9,578,295 B1* | 2/2017 | Morrison ............. | H04N 9/3185 |
| 2011/0120448 A1* | 5/2011 | Fitch ........................ | F24S 20/20 126/601 |
| 2012/0174909 A1* | 7/2012 | Koningstein ........... | F24S 20/20 126/601 |
| 2013/0032196 A1* | 2/2013 | Dipankar .............. | G01S 3/7861 136/246 |
| 2014/0116419 A1* | 5/2014 | Hernandez .............. | F24S 20/20 126/601 |

* cited by examiner

*Primary Examiner* — Daquan Zhao
(74) *Attorney, Agent, or Firm* — Andrew S. Naglestad (57) ABSTRACT

A system and method for localization and calibration of a heliostat is disclosed. The system comprises a controller and a camera configured to acquire images of a plurality of heliostats. The controller and camera are configured to acquire a first image of the plurality of heliostats, move one of the plurality of heliostats, acquire a second image of the plurality of heliostats, generate a difference image by subtracting the second image from the first image, identify the heliostat that was moved based on the difference image, and calibrate the position or orientation of the heliostat based on the difference image. The difference image is generated by pixel-wise subtraction of the second image from the first image. The pixel-wise subtraction exposes the heliostat and enables the calibration of the position and/or orientation of known heliostat positions.

14 Claims, 6 Drawing Sheets

HELIOSTAT LOCALIZATION IN CAMERA FIELD-OF-VIEW WITH INDUCED MOTION

CROSS-REFERENCE TO RELATED APPLICATION(S)

This application claims the benefit of U.S. Provisional Patent Application Ser. No. 62/692,333 filed Jun. 29, 2018, titled "Heliostat localization in camera field-of-view by spinning heliostat," which is hereby incorporated by reference herein for all purposes.

TECHNICAL FIELD

The invention generally relates to a technique for localizing solar trackers in a power plant. In particular, the invention relates to a system and method for using motion to identify the position of solar trackers.

BACKGROUND

Solar energy may be collected in enormous power plants using power towers and hundreds or thousands of heliostats. The heliostats include mirrors configured to track the sun over the course of the day and reflect sunlight to the power towers. The distance between the farthest mirrors and the associated power tower may be hundreds of meters. The mirrors, in turn, may have an area as small as a square meter. At these scales, a heliostat may be barely visible. Moreover, the view of the distant mirrors may be blocked by other intermediate mirrors, thus making tracking and calibration very challenging. There is therefore a need for a high-precision technique for efficiently locating and calibrating mirrors.

SUMMARY

The invention features a novel system and method for localization and calibration of a heliostat in a large heliostat field. The system comprising a camera configured to acquire images of a plurality of heliostats including the first heliostat, and a controller. The controller is configured to: acquire a first image of the plurality of heliostats; move the first heliostat; acquire a second image of the plurality of heliostats; generate a difference image by subtracting the second image from the first image; identify the first heliostat based on the difference image; and calibrate the position or orientation of the first heliostat based on the difference image. The difference image is generated by pixel-wise subtraction of the second image from the first image.

In the preferred embodiment, movement the first heliostat comprises rotation of a mirror. The second image may be acquired after rotation of the mirror is completed, or acquired during rotation of the mirror. The rotation exposes the heliostat of interest and enables the calibration of the position and/or orientation, namely one or more corners of the mirror, mirror center, or mirror centroid.

In some embodiments, the invention features a system for calibrating positions of heliostats. In this case, the controller may be configured to generate a cost function based on the distance between the observed position of each heliostat and the known position of the same heliostat. The resulting cost function is therefore a function of each of the plurality of heliostat positions, or the error in that position. The controller then minimizes the cost function by generating an estimated position for some or all of the heliostats. The estimated positions, generated through optimization of the cost function, represent more accurate estimates of the positions of the heliostats. These accurate estimates are then used to update the known positions of the heliostats in the model of the heliostat field, which is used to aim the heliostat mirrors and direct sunlight onto the receiver.

In some embodiments, the invention features a system for calibrating camera orientations as well as positions of heliostats. In this case, the controller may be configured to generate a cost function also based on an angular error in the orientation of one or more cameras. The resulting cost function is therefore a function of heliostat positions as well as one or more camera angles, namely elevation angle, azimuth angle, and roll angle. The controller then simultaneously generates estimated positions of heliostats and estimated angles of one or more cameras for purposes of minimizing the cost function. The estimated positions and orientations generated after minimization of the cost function represent more accurate estimates of the position of one or more heliostats and camera orientations. The estimates are then used to update, i.e., calibrate, the known positions of the heliostats and orientations of the cameras.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

The invention in the preferred embodiment features a localization technique for determining the precise position and physical profile of heliostats and/or the orientation of tracking cameras. Using the present invention, the location of heliostats in a field of identical solar trackers can be quickly determined and the heliostat positions and camera orientations calibrated. Although the preferred embodiment includes a heliostat with a mirror, the present invention may be employed with photovoltaic panels as well as other solar trackers.

Figure 1:
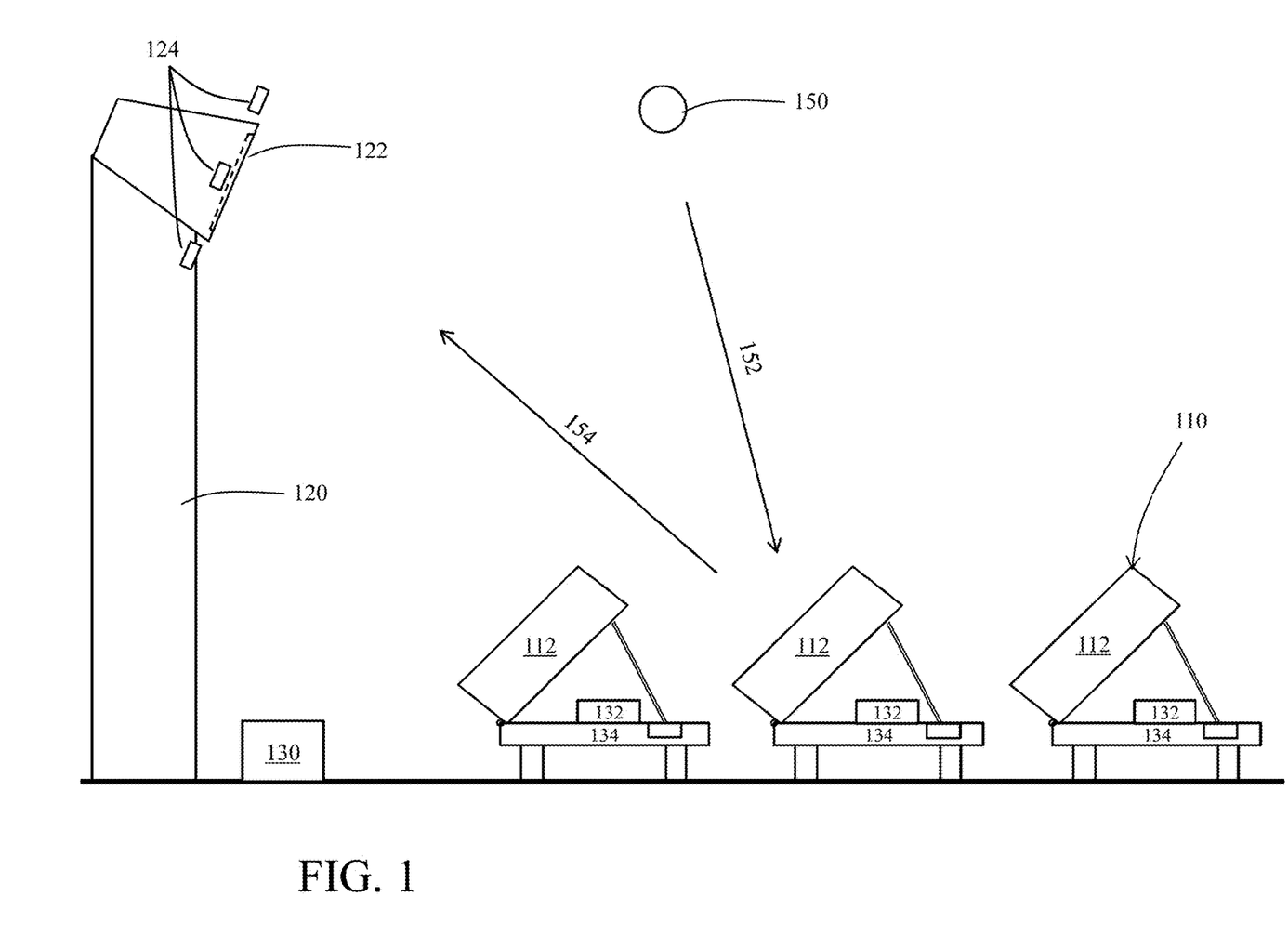
FIG. 1 is a field of heliostats and a receiver tower, in accordance with a first embodiment of the present invention.

Referring to FIG. 1, modern solar thermal power plants generally employ a large number of heliostats 110 configured to track the sun 150 and reflect sunlight 152 onto a receiver tower 120. Each receiver tower may receive sunlight from hundreds of heliostats. Each of these heliostats 110 must precisely reflect light 154 from a mirror 112 into an aperture of the receiver 122 on the tower 120 in order to maintain maximal efficiency. To ensure that each heliostat 110 precisely aims sunlight through the receiver aperture 122, the heliostat tracking controllers are accurately calibrated and their position and orientation refined using a feedback loop including tracking cameras 124 mounted around the receiver aperture 122. Images from the tracking cameras 124 are used to correct for any differences between the position/orientation of the heliostats as represented in a model of the heliostat field and the actual position/orientation of the heliostats. In addition, the position and orientation of the tracking cameras 124 may also be refined using the same feedback loop to correct for any differences between the model position/orientation of the tracking cameras and the actual position/orientation of the tracking cameras.

In some solar power plants, the digital cameras 124 are mounted on the receiver tower 120 around the periphery of the aperture where they have a view of the heliostats 110 that direct light to the receiver tower on which they are mounted. The field of view (FOV) of each tracking camera 124 may include a large number of heliostats including heliostats that direct light to the same receiver tower as well as heliostats that direct light to other receiver towers. Resolving any single heliostat can be extremely challenging, especially in view of the fact that the heliostats in front block the view of heliostats further away, resulting in partial views of nearly all the heliostats.

To improve the identification and resolution of each heliostat, the solar thermal power plant in the preferred embodiment employs a localization controller or processor 130 to find the precise location of each heliostat, specifically the mirror of each heliostat, and/or the position and orientation of the cameras 124. The localization controller 130 is coupled to the plurality of cameras 124 and the heliostat motor controllers 132 that determine the orientation of each of the heliostat mirrors. During a localization routine, the localization controller 130 is configured to induce a motion in each heliostat mirror, preferably one heliostat at a time, and determine the location of that heliostat mirror in each camera's FOV. In the preferred embodiment, a heliostat mirror is made to rotate about its azimuth angle using a carousel 134 configured to turn, rotate, or spin the associated mirror 112 about a partial or full revolution. In this manner, the location in the digital image of every heliostat 110 can be quickly and accurately determined. Thereafter, the tracking algorithm can look to this particular portion of the FOV for purposes of calibrating the position and/or orientation of that heliostat. The precise positions and/or orientations of the heliostats are used to refine the model of the heliostat field, thereby improving the accuracy with which they direct sunlight to the receiver aperture 122.

Figure 2:
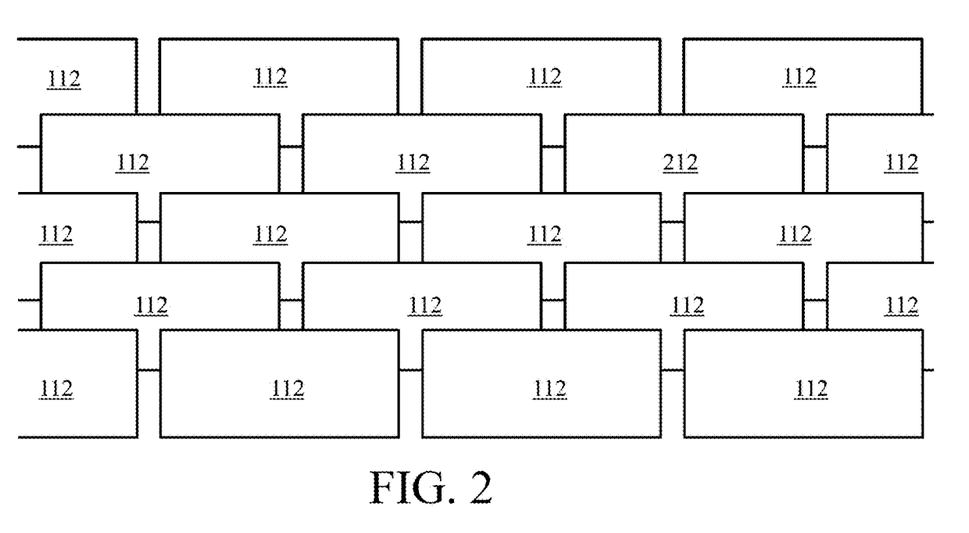
FIG. 2 is a field of heliostats as seen from a camera on a receiver tower, in accordance with a first embodiment of the present invention.

As illustrated in FIG. 2, the localization routine executed by the localization controller 130 begins with each camera 124 capturing a first digital image of at least a portion of the heliostat field. The portion of the heliostat field includes the heliostat mirror 212 currently being localized as well as the neighboring heliostat mirrors 112. The image is acquired while all the heliostat mirrors 212, 112 are stationary. Next, the mirror 212 (or small number of mirrors) being localized is made to turn, spin, rotate, or otherwise move while the remaining mirrors 112 are stationary.

Figure 3:
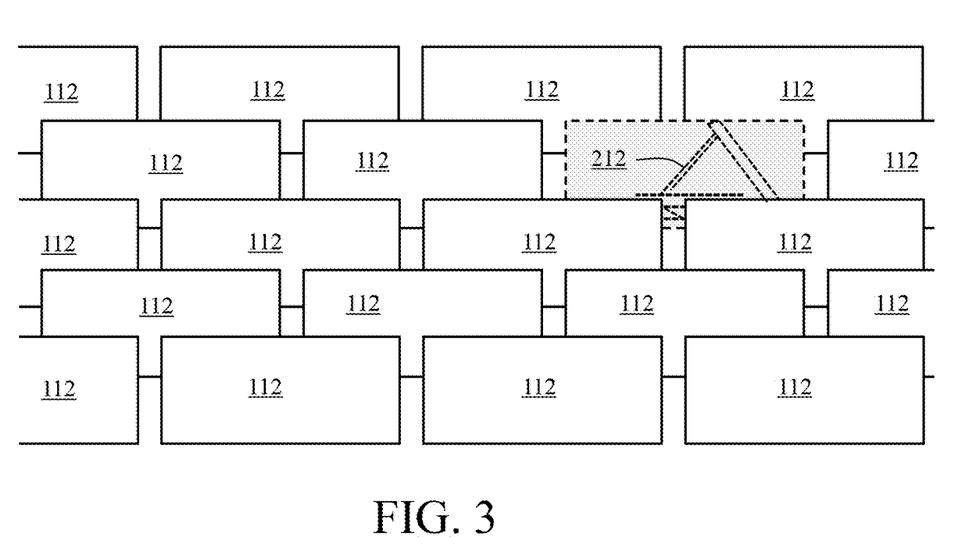
FIG. 3 is a field of heliostats with one rotating heliostat, in accordance with a first embodiment of the present invention.

During or after this motion is induced, the cameras 124 acquire at least a second image, as illustrated in FIG. 3. For each camera, the second image is then subtracted from the first image, or vice versa, and a threshold applied to the pixel intensity values. The heliostat mirrors 112 that are stationary in all images are subtracted out as their pixel values remain unchanged between images. The heliostat mirror 212 moved between the first and second images, however, does not subtract out because of differences in pixel intensity or color.

Figure 4:
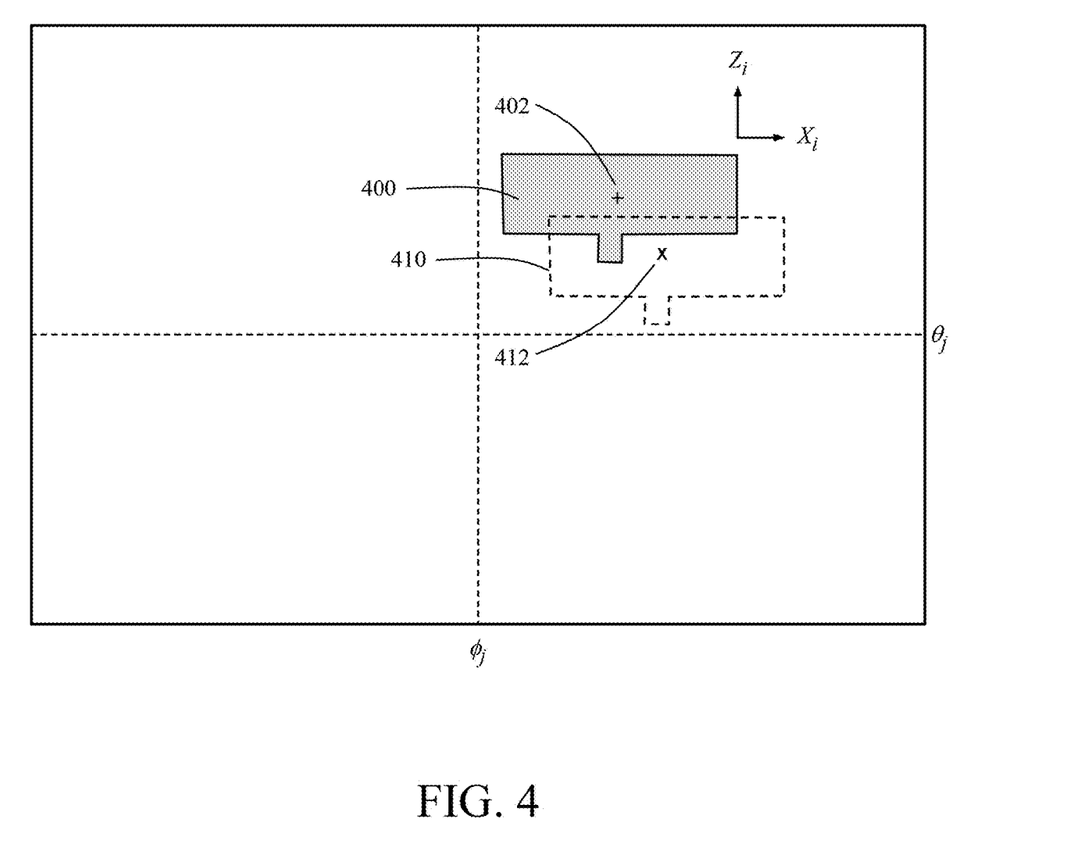
FIG. 4 is an image of a pixel-wise difference between a first image with a static field of heliostats and second image with one heliostat moved, in accordance with a first embodiment of the present invention.

Referring to FIG. 4, the heliostat mirror 212 that has been moved produces non-zero pixels 400 that persist after the subtraction and thresholding. These pixels 400 precisely correspond to the heliostat mirror 212 that has been moved, thereby providing a profile of the heliostat as viewed from receiver 122. Thereafter, the pixels associated with the profile may be used to detect, calibrate, and orient the heliostat mirror 212 in a quick and efficient manner described below. Calibration, as used herein, refers to the process of refining the known position and/or orientation of the heliostat mirror 212 in an analytical model of the heliostat field.

The localization controller 130 performs calibration in order to update a 3D model representing the position of the heliostat mirror based on observational data indicating where the heliostat mirror is actually located in 3D space. The known position of the heliostat mirror is represented by pixel profile 410, while the observed position of the heliostat mirror is represented by the pixel profile 400. The centroid of the profile 410 of the known position is represented by point 412, and the centroid of the profile 400 of the observed position is represented by point 402. The difference between the known position and observed position of the heliostat mirror can be characterized by a distance between (i) the centroid 412 of the pixel profile 410 derived from the 3D model and (ii) the centroid 402 of the pixel profile 400 derived from the difference image. This distance between centroids is then used to compute and minimize a cost function, as described below.

The difference image in FIG. 4 also depicts the orientation angles of the optical axis of the camera that acquired the first and second images. The elevation angle of the optical axis is represented by $\theta_j$, while the azimuth angle is represented by $\phi_j$. These orientation angles, along with the camera roll angle, are subject to calibration using the present invention as well. That is, the cost function that is computed and minimized may include an error term for one or more camera orientation angles along with the centroid error distances.

Figure 5:
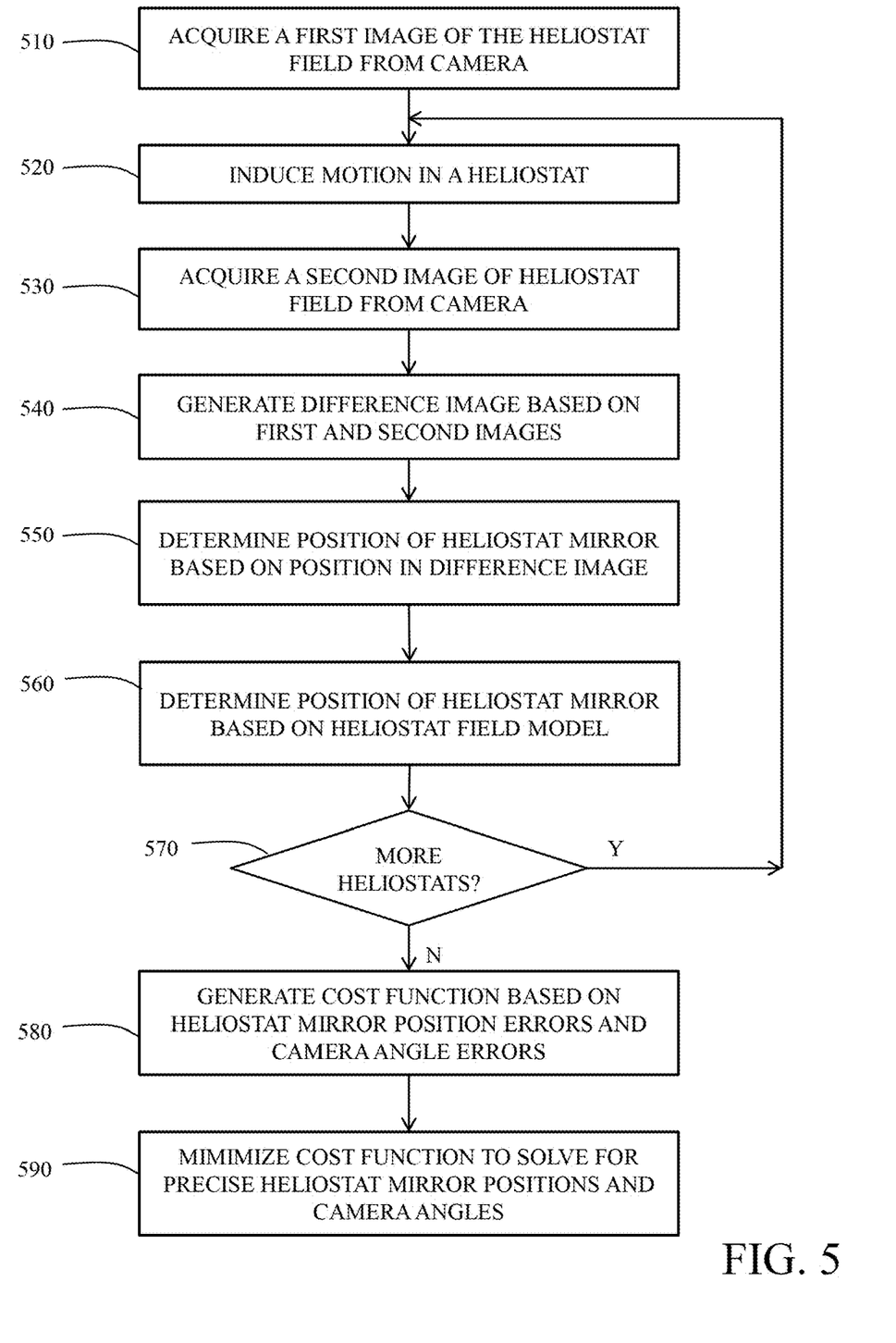
FIG. 5 is a flowchart of the method of calibrating the position of a heliostat, in accordance with a first embodiment of the present invention.
Figure 6:
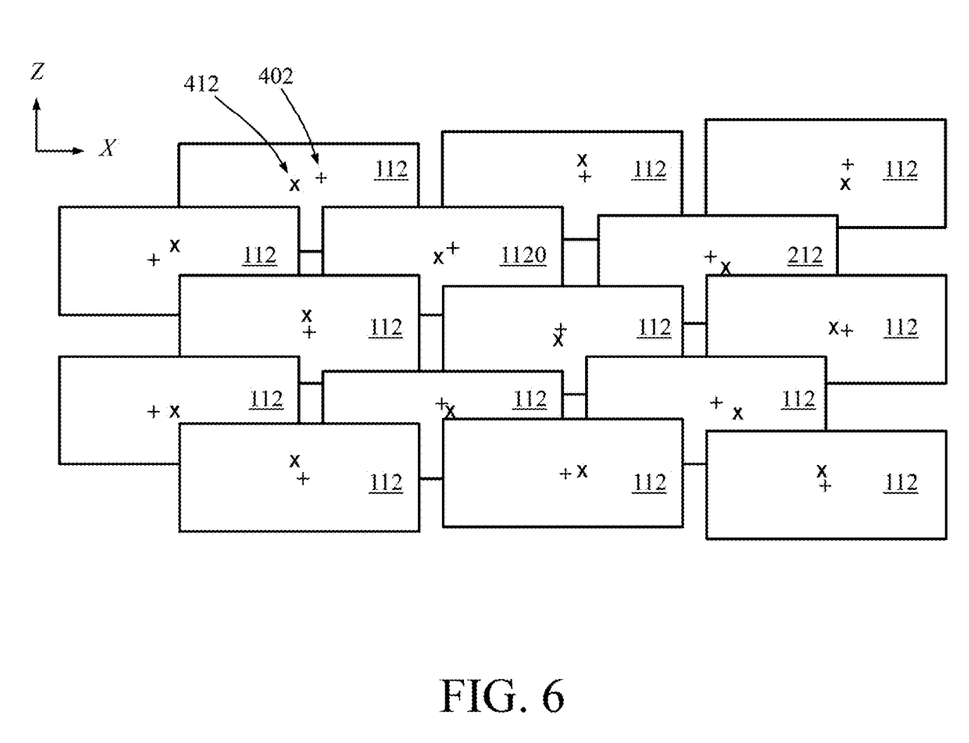
FIG. 6 is a field of heliostats showing mirror profile centroids as measured and calculated, in accordance with a first embodiment of the present invention.

Illustrated in FIG. 5 is a flowchart of the method of localizing heliostats in the camera field of view and calibrating the positions of the heliostat. First, a digital camera 124, preferably the same camera used to track the sun, is used to capture 510 a first image of a plurality of the heliostats that direct light to the associated receiver aperture 122. The plurality of heliostats include the heliostat currently being localized as well as a number of other neighbor heliostats. The heliostat currently being localized is characterized by a first position and orientation (pose).

Next, the localization controller 130 induces 520 motion in the heliostat being localized (or in a subset of heliostats being localized). Motion may include rotation of the heliostat mirror 212 about an azimuth angle and/or rotation of the heliostat mirror about an elevation angle. After rotation, the heliostat 212 being localized is characterized by a second pose. The camera 124 then acquires 530 a second image of the heliostat field after the intended motion has been completed. In some embodiments, the camera 124 acquires 530 the second image, or a set images, of the heliostat field while the heliostat of interest is actually in motion.

Thereafter, the localization controller 130 determines the difference 540 between the first and second images resulting from the heliostat motion using, for example, a predetermined threshold. Assuming all the neighbor heliostats remain stationary, the only change in the image is associated with the one heliostat 212 that was moved. The difference image therefore produces the pixel profile 400 representing the portion of the camera FOV occupied by the heliostat 212. This heliostat profile 400 is then associated with the one heliostat mirror 212.

The "observed" position of the heliostat mirror 212 is estimated 550 based on it's pixel profile 400. In the preferred embodiment, the position is characterized by the centroid 402 of its pixel profile, although the position of the heliostat mirror may be characterized by other variables in different references frames, depending on the preference of one skilled in the art.

Next, the "known" position of the heliostat mirror 212 is estimated 560 based on the 3D analytic model of the heliostat field. This model is maintained by the localization controller 130 and includes a mathematical representation of all the heliostats, all the cameras, and their respective location and orientation in 3D space. In the preferred embodiment, three position measurements $(X_i, Y_i, Z_i)$ and three orientation measurements are used to represent some or all of the components of the heliostat field. The model may be derived from construction plans or a survey of the field after construction. This model can then be used to determine the relative distance and orientation between any two components as well as the "appearance" of any component as view from another component.

Figure 7:
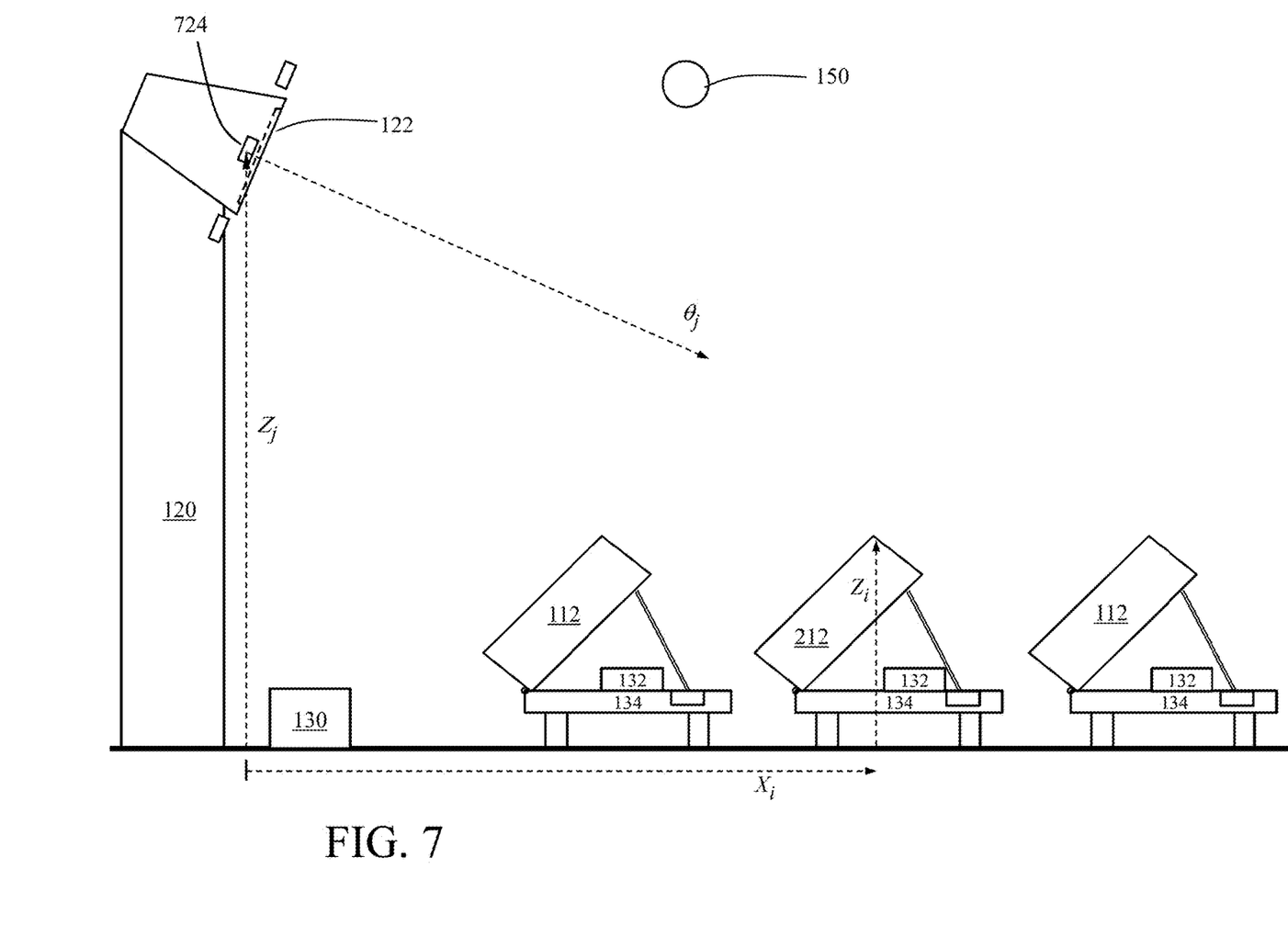
FIG. 7 is a diagrammatic illustration showing heliostat position coordinates and camera orientation angle, in accordance with a first embodiment of the present invention.

In the preferred embodiment, the known position of the heliostat mirror 212 is characterized by the centroid of the pixel profile 410, which is generated from the 3D analytical model. This pixel profile 410 represents an estimate of what the heliostat mirror 212 should look like if it were captured in an image acquired by camera 724, assuming the physical layout of the heliostat field as modeled, the size and shape of the heliostats, as well as the orientation of those heliostats. As shown in FIG. 7, the profile and centroid of the heliostat mirror is estimated, e.g., based on the vertical height, $Z_i$, of the heliostat; the horizontal distance, $X_i$, of the heliostat from the camera 724; the vertical height, $Z_j$, of the camera 724; the angle, $\theta_j$, and azimuth angle, $\phi_j$, of the optical axis of the camera 724; the orientation of the heliostat mirror 212; as well as the position and orientation of the mirrors 112 that block the view of the heliostat mirror 212.

This process above is repeated until the centroid of the observed centroid and known centroid have been determined for all the heliostat mirrors associated with the particular receiver tower. Upon completion, the decision block 570 is answered in the negative.

After all the centroids are determined, the localization controller 130 generates 580 a cost function based on the error between (i) each heliostat mirror position, as determined from the difference images in step 550, and (ii) the corresponding heliostat mirror location, as determined from the analytical model in step 560. In the preferred embodiment, the cost function is the sum of the squares of the errors as measured for each of the sample measurements. For purposes of estimating the error associated with a heliostat mirror, a sample is a measure of the displacement of the centroid as observed. That is, the error associated with this sample is the distance between the "observed" centroid and the "known" centroid as calculated from the analytical model. In some embodiments, the orientation of the heliostat as well as the position and/or orientation of the cameras 124 may also be included in the cost function by extension of the sum of the squares of those samples.

The localization controller 130 then applies 590 a nonlinear minimizer algorithm to minimize the cost function and simultaneously solve for the three dimensional position coordinates of the heliostat mirrors, namely $(X_i, Y_i, Z_i)$ for each heliostat mirror i. If the vertical height coordinates, $Z_i$, are known, the localization controller 130 may be configured to solve for two heliostat position coordinates—namely $(X_i, Y_i)$—and the camera angle. If solving for the vertical height coordinate, $Z_i$, the number of parameters solved for is $3*(N_h+N_c)$ where $N_h$ is the number of heliostats and N is the number of cameras. In general, the number of constraints is $2*N_h*N_c$, requiring $N_h$ to be greater than or equal to $3*N_c/(2*N_c-3)$. In addition, the more cameras there are and the more spatially separated they are, the better solving for heliostat locations will be constrained.

In the preferred embodiment, the nonlinear minimizer algorithm employed by the localization controller 130 is the Nelder-Mead Simplex, which minimizes the cost function representing the estimated heliostat positions and camera angles, for example.

In the preferred embodiment, the error function is given by the sum of square distances between the centroid of a sample and the projection into image pixel space using the camera projection model of the corresponding 3D coordinate. In other embodiments, the nonlinear minimizer is based on the Levenberg-Marquardt technique, Constrained optimization by linear approximation (COBYLA) technique, Limited-memory BFGS (L-BF GS or LM-BFGS) technique, or comparable algorithm.

Upon completion of the nonlinear minimizer algorithm 590, the localization controller 130 has effectively solved for the heliostat mirror positions and/or camera orientations that minimize the cost function. The heliostat mirror positions and/or camera orientations are then used to update, i.e., calibrate, the known positions and orientations as represented in the analytical model of the heliostat field. Thereafter, heliostats can be configured with the information needed to more accurately aim reflected sunlight into the receiver aperture 122. The improved accuracy translates into an increase in solar energy captured and overall improvement in efficiency of the solar power plant.

In some embodiments, the first image is acquired with the heliostat's pose oriented such that the vector normal to the mirror is directed substantially toward the camera or substantially away from the camera. For the second pose, the heliostat is rotated until the mirror normal vector is facing 90 degrees from camera and the mirror seen edge-on, thereby maximizing the contrast between the first image and second image.

In another embodiment, for the first image, the heliostat mirror is made to reflect a bright section of sky to the camera. For the second image, the heliostat is moved so that the mirror reflects a dark section of sky to the camera. The actual brightness and darkness is not relevant so long as these images of sky are bright and dark relative to each other to maximize the contrast between the first and second images. In yet another embodiment, the second image or set of images is acquired while the heliostat is spinning or otherwise being moved. The difference between the first and second images are then determined and the heliostat localized in the camera FOV based on the non-zero pixel values.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer, processor, or controller capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A system for localization of a first heliostat in a heliostat field, the system comprising:
   a camera configured to acquire images of a plurality of heliostats including the first heliostat;
   a controller configured to:
   a) acquire a first image of the plurality of heliostats with the camera;
   b) move the first heliostat;
   c) acquire a second image of the plurality of heliostats with the camera;
   d) generate a difference image by subtracting the second image from the first image, or by subtracting the first image from the second image;
   e) identify the first heliostat based on the difference image; and
   f) calibrate the position of the first heliostat based on the difference image.

2. The system in claim 1, wherein the difference image is generated by pixel-wise subtraction of the second image from the first image.

3. The system in claim 1, wherein the first heliostat comprises a mirror, wherein movement the first heliostat comprises rotation of the mirror.

4. The system in claim 3, wherein rotation of the mirror comprises rotation of the mirror about an azimuth angle or elevation angle.

5. The system in claim 4, wherein the second image is acquired after rotation of the mirror.

6. The system in claim 4, wherein the second image is acquired during rotation of the mirror.

7. The system in claim 1, wherein the first heliostat is characterized by a mirror normal vector orientated toward the camera in the first image and substantially perpendicular to the camera in the second image.

8. The system in claim 1, wherein the first heliostat comprises a mirror oriented to reflect a portion of relatively bright sky in the first image and reflect a portion of relatively dark in the second image.

9. A method for localization of a heliostat in a heliostat field, the method comprising:
   a) acquiring a first image of the plurality of heliostats;
   b) moving a first heliostat after acquiring the first image;
   c) acquiring a second image of the plurality of heliostats;
   d) generating a difference image by subtracting the second image from the first image;
   e) identifying the first heliostat based on the difference image; and
   f) calibrating the position of the first heliostat based on the difference image.

10. The method in claim 9, wherein the first heliostat is characterized by a normal vector orientated toward the camera in the first image and substantially perpendicular to the camera in the second image.

11. The method in claim 9, wherein the first heliostat comprises a mirror configured to reflect a portion of bright sky in the first image and reflect a portion of dark sky in the second image.

12. A system for calibrating positions of heliostats, the system comprising:
   a camera configured to acquire a plurality of images, each image comprising a plurality of heliostats;
   a controller configured to localize each of the plurality of heliostats, wherein the controller is configured to:
   a) for each of the plurality of heliostats:
      acquire a first image of the plurality of heliostats with the camera;
      move one heliostat of the plurality of heliostats;
      acquire a second image of the plurality of heliostats with the camera;
      generate a difference image by subtracting the second image from the first image;
      generate an observed position of the one heliostat based on the difference image; and
      generate a known position of the one heliostat; and
   b) generate a cost function, wherein the cost function is based on a distance between the observed position and known position of each of the plurality of heliostats;
   c) for one or more of the plurality of heliostats, generate an estimated position that minimizes the cost function; and
   d) for one or more of the plurality of heliostats, update the known position based on the estimated position that minimizes the cost function.

13. The system of claim 12, wherein the cost function comprises a sum of squares, each square comprising a distance between a centroid of an observed mirror profile and a centroid of a known mirror profile, for each of the plurality of heliostats.

14. The system of claim 13, wherein the controller is further configured to calibrate an orientation angle for one or more cameras, wherein the controller is configured to:
   e) generate the cost function based, in part, on an angle corresponding to the orientation angle of one or more cameras;

f) for the one or more cameras, generate an estimated orientation angle that minimizes the cost function; and
g) for the one or more cameras, update a known orientation angle based on the estimated orientation angle that minimizes the cost function.

\* \* \* \* \*